United States Patent

[11] 3,597,596

| [72] | Inventors | James L. Lawless<br>Denver;<br>Otis H. Willoughby, Boulder, both of, Colo. |
|---|---|---|
| [21] | Appl. No. | 797,509 |
| [22] | Filed | Feb. 7, 1969 |
| [45] | Patented | Aug. 3, 1971 |
| [73] | Assignee | The United States of America as represented by the United States Atomic Energy Commission |

[54] RADIOCHEMICAL ANALYSIS OF LARGE QUANTITIES OF MATERIALS
4 Claims, 5 Drawing Figs.

[52] U.S. Cl. .................................. 250/43.5 MR
                                            250/106 SC
[51] Int. Cl. .................................. G01n 23/10
[50] Field of Search ......................... 250/43.5 R,
                                            106 SC

[56] References Cited
UNITED STATES PATENTS

| 2,885,557 | 5/1959 | Kizaur .......................... | 250/106 SC |
| 3,431,416 | 3/1969 | Jones, Jr. et al. ............... | 250/106 SC |
| 3,437,812 | 4/1969 | Packard ......................... | 250/106 SC |
| 3,493,749 | 2/1970 | Olson ............................ | 250/106 SC |
| 2,924,718 | 2/1960 | Packard et al. ................. | 250/106 SC X |
| 3,027,458 | 3/1962 | Flowler et al. ................. | 250/106 SC X |
| 3,246,150 | 4/1966 | Stoddart et al. ................ | 250/106 SC X |

*Primary Examiner*—Archie R. Borchelt
*Attorney*—Roland A. Anderson

ABSTRACT: An apparatus and method for measuring radiation from bulk quantities of materials such as waste materials or ash to determine quantities of radiochemical substances included therein comprising a container for the materials, radiation detection means radially arranged about the container, a device for producing rotation and translation relative to the container and radiation detection means and means for compensating for material density changes.

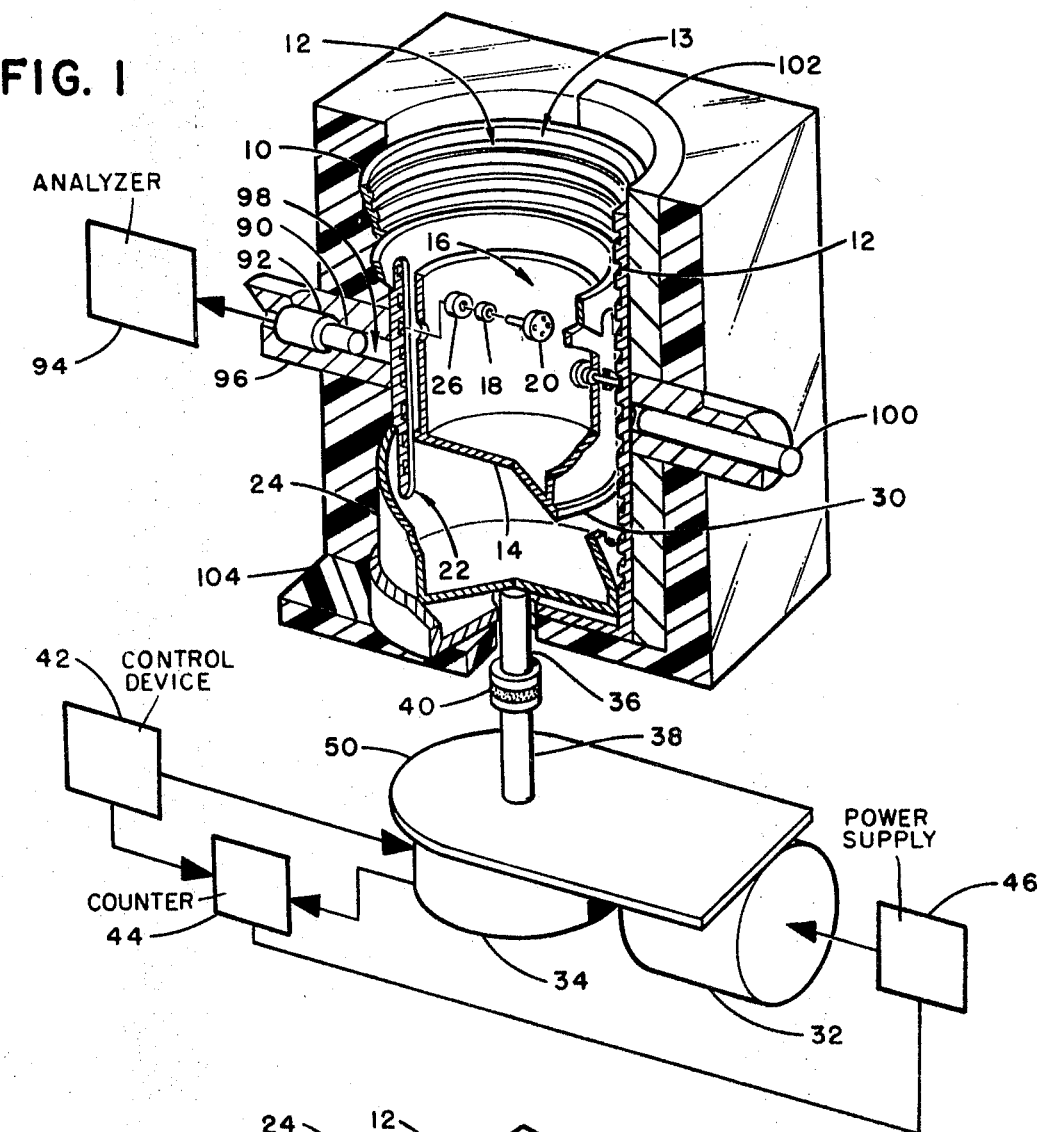

INVENTORS
JAMES L. LAWLESS
OTIS H. WILLOUGHBY
BY 3,597,596

RADIOCHEMICAL ANALYSIS OF LARGE QUANTITIES OF MATERIALS

BACKGROUND OF INVENTION

The measurement and recovery of valuable radioactive isotopes or radioelements from contaminated waste prior to disposal is an ever increasing problem accompanying the growth of nuclear industries. These radioelement containing materials may be generated by nuclear industries in many ways. For instance, combustible material may be burned leaving a radioactive ash or noncombustible residue such as siliceous firebrick. This residue and other radioactive waste material such as insulation may be leached, washed, or subjected to other extraction processes to remove and recover the radioactive isotopes if sufficient quantities are present in the material to make their recovery economical. Further, relatively large amounts of radioelement containing bulk material are processed for various reasons in the nuclear industry and it may be desirable to ascertain the radiation level of the bulk material or the quantities of a particular radioelement in the bulk material at numerous points in the process. Ordinary radiation monitoring instruments or apparatus are limited to localized detection of radiation levels. Where relatively small amounts of material are involved such detection techniques are adequate, but in bulk quantities of material localized pockets of high radiation may escape detection and the large mass or varying density of material may attenuate radiation emission to produce erroneous radiation readings. A thorough radiometric examination with prior art statistical sampling techniques would be tedious, time consuming and would result in unnecessary exposure of personnel to radiation and possible contamination.

A reduction in sampling of bulk materials and subsequent determination of radioisotope content through chemical and instrumental means has been achieved through the use of the subject invention.

SUMMARY OF INVENTION

It is therefore an object of the present invention to provide an apparatus and method for rapid scanning and radiation measurement of bulk quantities of material.

It is also an object to provide an apparatus for accurately determining radiation or radioelement levels in bulk material having regions of varying density.

Further objects and advantages will appear from the following description of one embodiment of the invention.

The present invention comprises a rotatably mounted container for holding an enclosed bulk quantity of material, radiation detection means for radiochemically analyzing said material, means for rotating and translating the container relative to the radiation monitoring devices and means for compensating for varying density of said material.

DESCRIPTION OF THE DRAWINGS

The present invention is illustrated in the following drawings wherein:

FIG. 1 is a perspective view partially in cross section of an embodiment of a radiation measuring system for bulk materials;

FIG. 2 is an enlarged segmented, cross-sectional view of the supporting mechanism for the bulk material specimen container shown in FIG. 1;

DETAILED DESCRIPTION

Figure 3:
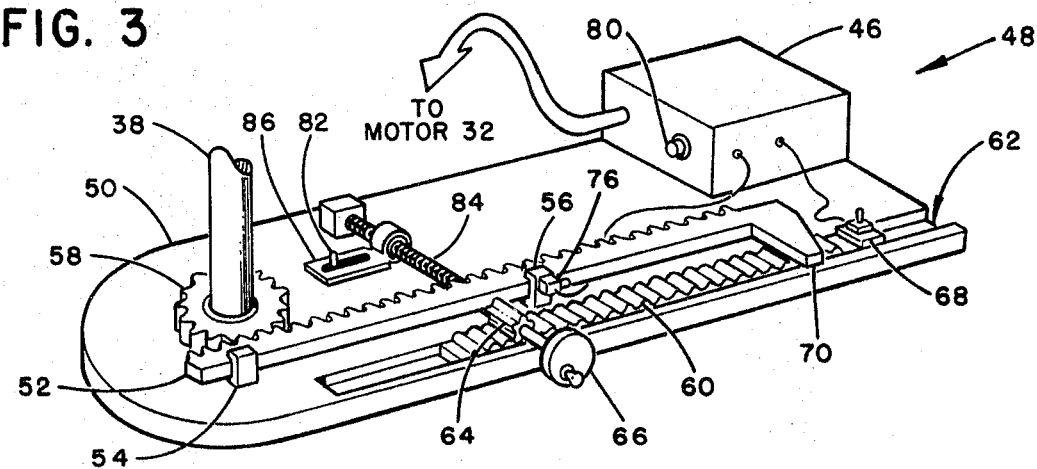
FIG. 3 is a perspective view of an automatic control mechanism for the drive system utilized in FIG. 1.

A bulk material radiochemical counter apparatus may include, as shown in FIG. 1, a fixed or stationary housing or member 10 having a generally helical groove or recess 12 disposed in and longitudinally extending along the inner surface of a cylindrical bore 13 of the member. Groove 12 may be replaced if desired with an inwardly extending lip or shelf having the same helical configuration. The number of turns of groove 12, or a suitable lip, per longitudinal dimension may be selected to achieve a desired scanning rate of the bulk material with a particular drive mechanism described below together with a complete and thorough scan of all portions of the bulk material specimen. A typical groove in a member 10 may have about 1 turn per inch.

Helical groove 12 or a suitable lip should have sufficient depth or width to provide the required support for the bulk material and a generally cup-shaped container 14. Container 14 may be adapted to receive and hold the bulk material directly in its hollow cavity or chamber 16 or within a separate container or bag (not shown) in which the bulk material may be conveniently handled and moved. The separate container or bag may be made of an appropriate material such as a plastic, like polyethylene or as a rigid or semirigid metal, like steel. Container 14 may be supported from groove 12 by two or more drive elements or pins 18 radially extending through the container sidewalls into grooves 12 around the periphery of the container (as shown in greater detail in FIG. 2). Pins 18 may be held in position on the sidewall of container 14 by a suitable bracket 20.

Container 14 may be rotatably driven along grooves 12 and consequently the longitudinal axis of member 10 by the coaction of pins 18 and the sidewalls of a corresponding number of slots 22 longitudinally extending through and partially along the sidewalls of a rotatably driven, tubular member 24, intermediate container 14 and member 10. Pins 18 may be adapted to freely rotate along groove 12 and slots 22 within the sidewalls of container 14 by conventional bearing means 26 and 28 or conventional bearing surfaces. Container 14 may be held in a generally upright position by use of more than two supporting pins alone or in conjunction with an annular stabilizing ring 30 disposed about the periphery of the container at any appropriate location and having an outside diameter slightly less than the inside diameter of tubular member 24. It may be desirable in some applications to eliminate ring 30 and closely dimension container 14 to the inside diameter of tubular member 24 subject to additional friction over the increased contacting surface area.

Members 10 and 24 and container 14 may be formed from any desired material, preferably a radiation transparent material such as polyvinylchloride, nylon or polytetrafluoroethylene. The desired radiation transparency may depend on the desired sensitivity of the system. Relatively nontransparent and structurally stronger materials such as aluminum or magnesium may be used where high levels or radiochemicals are present since the additional absorption is compensated for as described below.

Tubular member 24 may be rotatably driven by a conventional alternating current or direct current motor 32 and variable speed drive mechanism 34. Tubular member 24 may be removably attached or fastened to variable speed drive mechanism 34 through shafts 36 and 38 and a flexible or otherwise shaft coupling 40 by any suitable means (not shown) such as a key and keyway or the combination of a set screw against a flat on shaft 36.

As will be explained in greater detail below, it is generally desirable that all bulk material specimens be scanned for the same period of time (such as about 100 seconds) to provide reproducible data and convenient data extraction. If the bulk material specimens placed in container 14 vary in size, the length of travel of the container along the longitudinal axis must be lengthened or shortened accordingly to provide scanning of the entire specimen without scanning unoccupied portions of the container. In order to maintain the scanning period constant as the length of travel varies, the speed of rotation of the specimen must also be corresponding adjusted. Further, it may be desirable to scan the bulk material specimen as the specimen travels (and rotates) first in one direction and then the other direction to obtain an averaging of the data. For example, a total scanning period may include a specimen scan with the container rotating counter clockwise and traveling upward through member 10 followed by a clockwise rotation downward.

Such a control function may be achieved automatically with adjustable electrical or electromechanical control and counter devices or circuits 42 and 44 in conjunction with the motor 32 power supply 40. The reversal of direction may be achieved by reversing the direction of rotation of motor 32 by power supply 46 (as shown) or by suitable gear changing or adjustment in mechanism 34.

Control device 42 may be any conventional mechanism which may simultaneously or at least proportionally adjust the speed of variable speed drive mechanism 34 and vary the counting limits of counter circuit 44. Counter circuit 44 may count the number of revolutions or portions of revolutions of tubular member 24 by conventional mechanical, optical or electrical techniques. When counter circuit 44 senses a cumulative count of revolutions at the limit preset by control device 42 with tubular member 24 turning in a first direction it may send a suitable signal to power supply 46 to reverse the direction of travel and begin counting again. When the counter again reaches the preset limit, it may instruct power supply 46 to deenergized drive motor 32. Additional scans may be achieved for further averaging of scanning results by providing further automatic recycling with counter circuit 44.

A typical automatic control mechanism which may provide these control functions is shown in simplified form in FIG. 3. The control mechanism may be mounted on any convenient table or platform, such as table 50 in FIG. 1. In this control mechanism, a rack 52 may be slideably driven, within the restraints provided by C-guides 54 and 56, by a pinion gear 58 or other direct drive couple or fixed to shaft 38 of the variable speed drive mechanism 34. Rack 52 will thus travel along its guides with a reciprocating motion as the drive mechanism turns tubular member 24 in both directions of rotation during a scan cycle.

Figure 4:
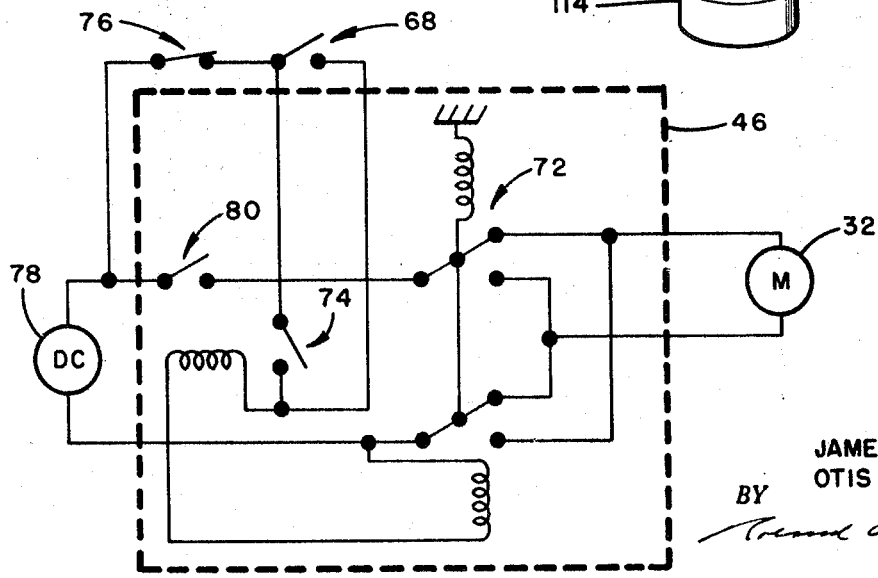
FIG. 4 is a schematic diagram of a typical control circuit for the control mechanism of FIG. 3.

An additional rack 60 may be slideably positioned within a suitable guideway or slide 62 on table 50 having a direction of travel parallel to rack 52. Rack 60 may be moved along guideway 62 by a pinion gear 64 turned by a suitable handwheel 66. A conventional electrical switch, such as a spring-biased, normally open microswitch 68, may be carried by a portion of rack 60. Rack 52 may include a protruding portion or lever 70 extending therefrom so as to operatively coact with microswitch 68 to close its switch terminals whenever lever 70 reaches the microswitch. Any suitable circuitry and drive motor may be employed to achieve desired operation of the mechanisms, by way of example, microswitch 68 may be electrically connected in series with a spring-biased, self-locking motor reversing relay 72 (see FIG. 4) in power supply 46. Preferably the control mechanism is such that stopping and starting points are similar in repeated instances. When lever 70 reaches the microswitch 68, the microswitch will be momentarily closed, energizing and closing a parallel connected self-locking relay 74 and switching relay 72. When relay 72 is switched, motor 32 is reversed and the rack 52 driven in the opposite direction releasing and opening microswitch 68, leaving relay 72 and 74 in their switched condition. Thus, the gear ratio between rack 52 and pinion gear 58 and the position of microswitch 68 determines the number of turns of tubular member 24 and the length of travel of container 14. Normally closed microswitch 76 may be fixedly or movably positioned, such as on C-guide 56, in an operatively coacting position with lever 70 along the path of travel of rack 52. Microswitch 76 may be connected in series with a main power source, such as a direct current source 78 (an alternating current source may be used with consequent modifications of the control circuit in a manner well known in the art), and the motor reversing relay 72 as well as motor 32. When rack 52 is driven back to microswitch 76, the contacts of microswitch 76 are opened disconnecting direct current source 78 from motor 32 and relays 72 and 74. As a result, relays 72 and 74 will return to their normal switch positions. When it is desired to initiate another scanning cycle, a normally open starting switch 80 may be momentarily closed a sufficient time to bypass switch 76 and permit motor 32 to drive the lever 70 of rack 52 from contact with microswitch 76 and the consequent reclosing of its contacts. The scanning cycle may then proceed as described above.

The rotating speed of tubular member 24 may be correspondingly and proportionally adjusted when the container 14 travel distance is varied by positioning rack 60 and microswitch 68 by moving an adjustment arm or lever 82. Lever 82 may in turn adjust a conventional speed control gear or mechanism (not shown) in variable speed drive mechanism 34. Lever 82 may be adjusted together with rack 60 as handwheel 66 is turned by a screw 84 driven slotted plate 86, as shown. The length and rate of travel of container 14 may thus be simultaneously adjusted so as to maintain the scanning cycle period at some predetermined constant lever.

It will be apparent that for operations where the bulk material specimen scanned by this system always occupies the same volume, these speed and length of travel adjustments need not be made. For such an application, it may be desirable to use a drive system which rotates in only a single direction and utilizes a double cut "left-hand" and "right-hand" threadlike groove with interconnecting end portions on the inner surface of member 10 in place of a single groove 12. A double cut groove may provide the desired cyclic scan with a constant length of travel.

Scanning of the bulk material specimen may be achieved with a conventional radiation detector sensitive to the particular radiation and radiation energies emitted by the specimens to be scanned. A particularly suitable radiation detector may be scintillation counter including a scintillation crystal 90 (such as a NaI(Tl) crystal), and a photomultiplier and preamplifier device 92. The output of photomultiplier and preamplifier device 92 may be fed into a conventional single channel analyzer 94 which may be preset to a characteristic radiation energy level for the radioelement being detected in the bulk material specimen. The radiation detector may be initially positioned adjacent to the top portion of the bulk material specimen to ensure complete scan of the specimen. Provision may be made to either adjust the position of the radiation detector or the beginning position of the bulk material specimen (and likewise the position of switch 76) to this initial position so as to compensate for changing specimen volumes. The single channel analyzer may typically include a pulse-height analyzer with one or more discriminator circuits and a scaling circuit.

Suitable radiation shielding 96 such as lead, may be disposed about scintillator crystal 90 and photomultiplier and preamplifier device 92 to decrease any background radiation count and to collimate the radiation reaching crystal 90 through the opening 98 in the shielding facing the bulk material specimen.

It has been found that bulk material specimen density or matrix variations, which may affect the absorption rate of radiation emitted within the specimen, may be accurately compensated for by positioning an external source 100 of known radiation across the specimen from and directed towards the radiation detector. External source 100 may include a quantity of radioactive material such as a material having similar gamma radiation characteristics as the specimen undergoing measurement or any sufficiently penetrating gamma emitter facing the radiation detector and surrounded by sufficient radiation shielding, as shown. Source 100 may be removable or have a removable cover shield.

Additional lead or other radiation shielding 102 may be positioned opposite the radiation detector to further eliminate or decrease background radiation. Neutron background radiation may also be decreased by surrounding the entire system, as shown, with a housing 104 made of polyethylene or the like and by placing a suitable cover over the open end of member 10 (not shown).

Neutron detectors and their associated circuitry (not shown) may be positioned around the specimen at convenient locations not blocked by shielding 102 to provide additional information or identification of radioelements under investigation.

The bulk material radiation analyzer of the present invention may be operated by assembling the apparatus as described with container 14 holding the bulk material specimen containing one or more radioelements disposed in a position with the radiation detector adjacent a top portion of the specimen. The automatic control mechanism may be set to a preselected number of revolutions corresponding to the desired travel of container 14 from the top to the bottom of groove 12 or a portion or multiple of that distance with the corresponding adjustment of the rate of revolution to permit a cyclic longitudinal pass of container 14 in the predetermined scanning time period. The drive motor 32 may be energized and container 14 propelled through the zone monitored by the radiation detector. After container 14 has been exposed to the radiation monitoring zone for a known period of time, a certain number of counts will be sensed by photomultiplier tube 92 and transmitted to single channel analyzer 94 and a conventional readout device or display (not shown).

A first run may be conducted as described without radiation source 100 uncovered or present and the total count in the single channel analyzer 94 scaler recorded. A second run may then be made with radiation source 100 uncovered or present and the scaler count recorded. Using data from previous runs made without any specimen and with and without the external radiation source, the total count of the first run may be adjusted to compensate for radiation absorption within the specimen and for background radiation. The adjusted total count represents directly the total amount of the radioelement of interest in the specimen. These adjustments may be made in accordance with the following equation:

$$\frac{C_1 - C_B}{\left(\frac{C_2 - C_1}{C_s}\right)^{1/2}} = C_{Adjusted}$$

wherein $C_s$ = radiation count with source only;
$C_B$ = background radiation count;
$C_1$ = radiation count with specimen only; and
$C_2$ = radiation with specimen and source.

This system may be utilized to determine the amount of uranium, thorium, plutonium, americium, etc. radioelements mixed together or alone with other nonradioactive materials such as ash, insulation, sweepings or the like in bulk quantities. For example, known specimens have been prepared and analyzed by this system in gallon quantities with measuring errors generally in the range of about 6 to 10 percent. A typical specimen was prepared by thoroughly mixing 175 grams plutonium as plutonium dioxide containing 75 p.p.m. (parts per million) of Americium and trace quantities of other elements with 2,705 grams of insulation. The system adjusted count indicated that about 160 grams of plutonium was included in the specimen.

Figure 5:
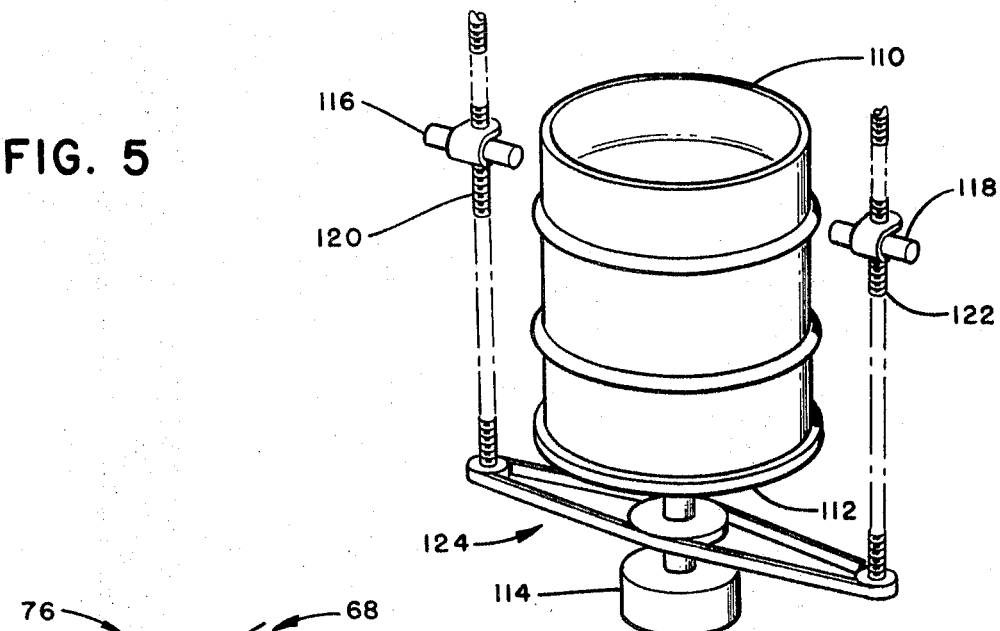
FIG. 5 is a perspective view of another embodiment of this invention.

Large quantities of material such as materials contained in conventional 55-gallon drums, may be conveniently analyzed using the system as shown in simplified form in FIG. 5. In this modified embodiment, the drum 110 may be suitably mounted directly on a rotatable table 112 driven by motor 114. One or more radiation detectors 116 and one or more radiation sources 118 may be vertically scanned along the longitudinal axis of drum 110 by lead screws 120 and 122 and gear or pulley system 124. The system may be operated in a manner similar to that described above. It should be noted that this system automatically compensates for any radiation absorption within the drum walls themselves.

The invention permits the entire quantities of waste or other materials containing radioelements to be measured and the amounts of given radioelements contained therein determined in a minimum period of time rather than analyzing only small samples of these materials. Errors arising from mass or density attenuation are greatly reduced or eliminated by the simultaneous rotation and translation of the container through the radiation detection zone as well as by the constant level radiation source which continuously irradiates the scintillator through the specimen. The invention is especially useful with waste disposal systems where large quantities of ash or noncombustable material must be analyzed to detect recoverable radioactive isotopes to determine the amount contained therein and the desirability of recovering the same should sufficient amounts be available. This system also aids in determining the method of waste disposal to be used to insure a safe disposal of the particular radioelements.

It will be understood that various changes in the details, materials, and arrangement of the parts which have been described in order to explain the invention, may be made by those skilled in the art within the scope of the appended claims.

What we claim is:

1. An apparatus for determining quantities of radiochemicals in a large quantity of solid as well as liquid material and mixtures thereof comprising a normally open-ended container to receive and hold said material, radiation detection means radially arranged about said container for monitoring preselected radiations emitted generally radially from and diametrically through said material, a tubular housing surrounding said container with a helical groove disposed along an inwardly disposed surface thereof, a plurality of drive pins carried by and radially extending from said container and resting on a wall portion of said helical groove, an upright rotatable open-ended tubular member intermediate said container and said housing having an upright wall with a plurality of generally upright longitudinal slots therethrough with each of said drive pins projecting entirely through respective of said slots into said grooves, means for rotating said tubular member and forcing edges of said longitudinal slots against respective drive pins to rotatively drive the drive pins of said container along said helical groove for simultaneously rotating and translating said container up and down with respect to said radiation detection means while monitoring said radiations passing through said material container, tubular member and housing, and a radiation source means positioned adjacent said container across from and aligned with said radiation detection means for emitting known radiation diametrically through said tubular member and tubular housing and container and material to said radiation detection means for compensating for material density changes.

2. The apparatus of claim 1 including means for simultaneously varying the speed and number of revolutions of said drive means for maintaining said radiation monitoring at constant time periods for each operation of the apparatus.

3. The apparatus of claim 2 including means for driving said container a predetermined number of revolutions in a first direction and then driving said container the same number of revolutions in the opposite direction.

4. A method for determining quantities of a radiochemical in large quantities of solid as well as liquid material and mixtures thereof, comprising the steps of simultaneously rotating and translating said material helically in one direction and then another direction past a radiation detector in a rotating container system, measuring and counting a radiation emitted radially from and diametrically through said material and through said rotating container system characteristic of the radiochemical as said helically moving material passes the radiation detector to obtain a first count ($C_1$), passing a standard beam of radiation diametrically through said material and rotating container system, simultaneously rotating and translating said material helically in one direction and then another direction past said detector, measuring and counting the radiation transmitted through said material and said rotating container system from said standard beam as said helically moving material passes the radiation detector to obtain a second count ($C_2$), measuring and counting the background radiation ($C_B$), measuring and counting the standard radiation beam ($C_s$) through said rotating container system, and compensating said first count with the amount of radiation absorption of said standard beam by said sample from said second count and with the background radiation count and standard radiation beam count to obtain a count $C$ representing the quantity of the radiochemical in said material by the formula $$\frac{C_1 - C_B}{\left(\frac{C_2 - C_1}{C_s}\right)^{1/2}} = C$$